(12) United States Patent
Yan et al.

(10) Patent No.: US 12,470,752 B2
(45) Date of Patent: Nov. 11, 2025

(54) VIDEO DECODING METHOD AND DEVICE, HARDWARE DECODER, AND STORAGE MEDIUM

(71) Applicants: VERISILICON MICROELECTRONICS (SHANGHAI) CO., LTD., Shanghai (CN); VERISILICON MICROELECTRONICS (CHENGDU) CO., LTD., Chengdu (CN)

(72) Inventors: Chen Yan, Shanghai (CN); Deyun Zhang, Shanghai (CN); Min Chen, Shanghai (CN)

(73) Assignees: VERISILICON MICROELECTRONICS (SHANGHAI) CO., LTD., Shanghai (CN); VERISILICON MICROELECTRONICS (CHENGDU) CO., LTD., Chengdu (CN)

( * ) Notice: Subject to any disclaimer, the term of this patent is extended or adjusted under 35 U.S.C. 154(b) by 55 days.

(21) Appl. No.: 18/241,939

(22) Filed: Sep. 4, 2023

(65) Prior Publication Data
US 2024/0114171 A1    Apr. 4, 2024

(30) Foreign Application Priority Data
Sep. 30, 2022    (CN) .......................... 202211210856.2

(51) Int. Cl.
*H04N 19/70* (2014.01)
*H04N 19/13* (2014.01)
(Continued)

(52) U.S. Cl.
CPC ............. *H04N 19/70* (2014.11); *H04N 19/13* (2014.11); *H04N 19/174* (2014.11); *H04N 19/176* (2014.11)

(58) Field of Classification Search
CPC ...... H04N 19/13; H04N 19/174; H04N 19/70; H04N 19/176
See application file for complete search history.

(56) References Cited

U.S. PATENT DOCUMENTS

| 2008/0095243 A1 | 4/2008 | Park et al. |
| 2010/0158130 A1 | 6/2010 | Chen et al. |

(Continued)

FOREIGN PATENT DOCUMENTS

| CN | 101409847 A | 4/2009 |
| CN | 105681801 A * | 6/2016 |

(Continued)

OTHER PUBLICATIONS

The First Office Action of priority document of CN2022112108562 and English Translation.
(Continued)

*Primary Examiner* — Zhubing Ren
(74) *Attorney, Agent, or Firm* — Whitestone Law, PLLC

(57) ABSTRACT

The present disclosure provides a video decoding method, a video decoding device, a hardware decoder, and a storage medium. The method comprises: decoding a target slice of a to-be-decoded video; determining coding blocks that need to be restored in a frame where the target slice is located, when detecting occurrence of an error to a syntax element of the target slice; and restoring the coding blocks that need to be restored based on a global preset syntax element template, so as to perform forced decoding of the target slice.

17 Claims, 6 Drawing Sheets

(51) Int. Cl.
    *H04N 19/174*    (2014.01)
    *H04N 19/176*    (2014.01)

(56) References Cited

U.S. PATENT DOCUMENTS

| | | | | |
|---|---|---|---|---|
| 2016/0094861 A1* | 3/2016 | Caron | ................ | H04N 21/6473 |
| | | | | 375/240.27 |
| 2022/0182686 A1* | 6/2022 | Yoo | .................... | H04N 21/2381 |
| 2022/0408083 A1* | 12/2022 | Kang | .................. | H04N 19/159 |

FOREIGN PATENT DOCUMENTS

| | | | |
|---|---|---|---|
| CN | 109788300 A | 5/2019 | |
| CN | 111010575 A | 4/2020 | |

OTHER PUBLICATIONS

The First search of priority document CN2022112108562 and English Translation.
The Second Office Action of priority document CN2022112108562 and English Translation.

* cited by examiner

VIDEO DECODING METHOD AND DEVICE, HARDWARE DECODER, AND STORAGE MEDIUM

CROSS-REFERENCE TO RELATED APPLICATION

The present disclosure claims priority of Chinese patent application with the filing number 2022112108562 filed on Sep. 30, 2022 with the Chinese Patent Office, and entitled "Video Decoding Method and Device, Hardware Decoder, and Storage Medium", the contents of which are incorporated herein by reference in entirety.

TECHNICAL FIELD

The present disclosure relates to the technical field of video coding, and in particular, to a video decoding method, a video decoding device, a hardware decoder, and a storage medium.

BACKGROUND ART

H.264 (a video coding standard)/HEVC (High Efficiency Video Coding, i.e., H.265) are digital video coding standards respectively proposed by the International Organization for Standardization and the International Telecommunication Union together. Compared with other formats, H.264/HEVC can guarantee relatively high image quality while providing a high compression ratio, and therefore are widely used in the industry.

A high data compression ratio means that a bit stream output by an encoder contains quite little redundant information, and once a situation of bit error or loss occurs in a coding or transmission process, it is quite hard to restore a complete reconstructed image from the bit stream where the error occurs; particularly, if a frame where the error occurs is a reference frame, all subsequent images that take this erroneous frame as a reference will be affected, thus causing spread of the error. Therefore, how to detect an error in an H.264/HEVC code stream and timely restore an image from the error is an important standard for evaluating decoding.

Currently, error detection and restoration for a code stream cannot be realized by a hardware decoder, and specifically, after the hardware decoder detects an error in the code stream, hardware pipeline will be interrupted, and the erroneous code stream cannot be restored.

SUMMARY

Embodiments of the present disclosure aim at providing a video decoding method, a video decoding device, a hardware decoder, and a storage medium, so as to realize error detection and restoration of a code stream based on hardware.

The present disclosure is implemented as follows.

An embodiment of the present disclosure provides a video decoding method, wherein the method includes: decoding a target slice of a to-be-decoded video; determining coding blocks that need to be restored in a frame where the target slice is located, when detecting occurrence of an error to a syntax element of the target slice; and restoring the coding blocks that need to be restored based on a global preset syntax element template, so as to perform forced decoding of the target slice.

In embodiments of the present disclosure, the target slice of the to-be-decoded video is decoded, and when it is detected that an error occurs to the syntax element of the target slice, the coding blocks that need to be restored in the frame where the target slice is located are determined; then the coding blocks that need to be restored are forcibly decoded based on one preset code stream template. Through this mode, the erroneous coding blocks can be timely restored without destroying hardware pipeline (i.e., the hardware is not interrupted when an error is detected). That is, this mode can realize the code stream error detection and restoration based on hardware only by increasing quite few hardware logics, has low complexity, and will not reduce the hardware decoding efficiency.

In combination with the technical solution provided in the above first aspect, in some possible implementation modes, the global preset syntax element template is constructed through the following steps, including: determining a preset value according to a meaning indicated by a key syntax element, wherein the key syntax element is configured to determine a fixed decoding branch; and assigning a value to the key syntax element according to the determined preset value, to obtain the global preset syntax element template.

In the embodiments of the present disclosure, by assigning the value to the key syntax element to obtain the global preset syntax element template, it can be ensured that a fixed decoding branch is selected from a plurality of decoding branches, guaranteeing that each coding block is decoded according to the fixed decoding branch, thus causing no interruption to the decoding and improving the hardware decoding efficiency.

In combination with the technical solution provided in the above first aspect, in some possible implementation modes, the key syntax element includes syntax elements of a Slice header and syntax elements of the coding block.

In combination with the technical solution provided in the above first aspect, in some possible implementation modes, the step of restoring the coding blocks that need to be restored based on a global preset syntax element template includes: combining the coding blocks that need to be restored into a new slice; and restoring the new slice based on the global preset syntax element template, wherein in a restoring process, a slice type of the new slice is determined by whether a frame where the target slice is located contains a reference frame.

In the embodiments of the present disclosure, by combining the coding blocks that need to be restored into a new slice for restoration, and meanwhile, assigning values to Slice header and Slice Data corresponding to the new slice by the global preset syntax element template, the hardware pipeline may not be destroyed, and the hardware decoding efficiency is improved. Moreover, the slice type of the new slice is determined by whether the frame where the target slice is located contains a reference frame, i.e., when the frame where the target slice is located contains the reference frame, the new slice can also be restored based on the reference frame, and through this mode, the visual effect of restored coding blocks can be improved.

In combination with the technical solution provided in the above first aspect, in some possible implementation modes, the occurrence of an error to a syntax element of the target slice includes occurrence of an error to the syntax element of the Slice header in the target slice.

In the embodiments of the present disclosure, after it is detected that an error occurs to the syntax element of the Slice header in the target slice, the coding blocks that need to be restored in the frame where the target slice is located are directly determined, and further the coding blocks that need to be restored are restored. Through this mode, the efficiency of hardware decoding is improved.

In combination with the technical solution provided in the above first aspect, in some possible implementation modes, the syntax element of the Slice header in the target slice is detected through the following steps, including: when detecting that a syntax element with the number of prefixes 0 greater than a preset threshold corresponding to a first syntax element exists in the first syntax element, determining that an error occurs to this syntax element, wherein the first syntax element is a syntax element based on Exponential-Golomb coding in the Slice header in the target slice.

In the embodiments of the present disclosure, whether an error occurs to the syntax element in the Slice header can be detected just by judging the number of prefixes 0 of the first syntax element, and this mode has high efficiency and occupies few resources, which is beneficial to hardware implementation.

In combination with the technical solution provided in the above first aspect, in some possible implementation modes, the step of determining coding blocks that need to be restored in a frame where the target slice is located, when detecting occurrence of an error to a syntax element of the target slice, includes: when detecting that an error occurs to the syntax element of the coding block in the target slice, reading a local preset syntax element template to correct this syntax element, and meanwhile reading a preset code stream template, so as to perform forced decoding of this coding block; and determining coding blocks that need to be restored in the frame where the target slice is located.

In the embodiments of the present disclosure, when it is detected that an error occurs to the syntax element of the coding block in the target slice, the forced decoding of this coding block can be performed based on the local preset syntax element template and the preset code stream template, and through this mode, the hardware pipeline may not be destroyed when an error occurs to the coding block, and subsequent restoring process continues to be completed.

In combination with the technical solution provided in the above first aspect, in some possible implementation modes, after reading the preset code stream template, the method further includes: reading a preset value of a syntax element corresponding to the syntax element where the error occurs in the local preset syntax element template, in response to a syntax element where an error occurs further existing in a to-be-decoded coding block.

In the embodiments of the present disclosure, after reading the preset code stream template, if a syntax element where an error occurs stills exists in this coding block, a preset value of a syntax element corresponding to the syntax element where the error occurs in the local preset syntax element template is read, so as to further realize forced decoding of this coding block.

In combination with the technical solution provided in the above first aspect, in some possible implementation modes, the syntax element of the coding block in the target slice is detected through the following steps, including: when detecting that a syntax element with the number of prefixes 1 greater than a preset threshold corresponding to a second syntax element exists in the second syntax element, determining that an error occurs to this syntax element, wherein the second syntax element is a syntax element based on CABAC (Context-based Adaptive Binary Arithmetic Coding) coding in the coding blocks in the target slice.

In the embodiments of the present disclosure, whether an error occurs to the syntax element in the coding block can be detected just by judging the number of prefixes 1 of the second syntax element, and this mode has high efficiency and occupies few resources, which is beneficial to hardware implementation.

In combination with the technical solution provided in the above first aspect, in some possible implementation modes, the preset threshold is determined by a coding standard corresponding to each syntax element.

In combination with the technical solution provided in the above first aspect, in some possible implementation modes, the step of determining coding blocks that need to be restored in a frame where the target slice is located includes: if detecting that no start code exists in a code stream behind the target slice, determining the coding blocks that need to be restored in the frame where the target slice is located, wherein the coding blocks that need to be restored are equal to total coding blocks in the frame where the target slice is located minus coding blocks that have been decoded currently.

In the embodiments of the present disclosure, if no start code exists in the code stream behind the target slice, it is considered that one frame ends, at this time, it can be determined that the coding blocks that need to be restored are equal to total coding blocks in the frame in which the target slice is located minus coding blocks that have been decoded currently. It can be seen that, through this mode, the coding blocks that need to be restored can be effectively determined.

In combination with the technical solution provided in the above first aspect, in some possible implementation modes, the step of determining coding blocks that need to be restored in a frame where the target slice is located includes: if detecting that a start code exists in a code stream behind the target slice, decoding a network abstraction layer unit (NALU) header corresponding to the start code, to obtain a type syntax element in the network abstraction layer unit header; and determining coding blocks that need to be restored in the frame where the target slice is located based on the type syntax element.

In combination with the technical solution provided in the above first aspect, in some possible implementation modes, the step of determining coding blocks that need to be restored in the frame where the target slice is located based on the type syntax element includes: determining the coding blocks that need to be restored in the frame where the target slice is located, if a numerical value of the type syntax element satisfies a preset condition, wherein the coding blocks that need to be restored are equal to total coding blocks in the frame where the target slice is located minus coding blocks that have been decoded currently; and indicating that the target slice and a next slice do not belong to the same frame, if the numerical value of the type syntax element satisfies the preset condition, and the next slice is a slice in the network abstraction layer unit corresponding to the start code.

In the embodiments of the present disclosure, if a start code exists in the code stream behind the target slice, a type syntax element of network abstraction layer unit is obtained by decoding, and when a numerical value of the type syntax element satisfies the preset condition, it indicates that the target slice and the next slice do not belong to the same frame, in this case, it can be determined that the coding blocks that need to be restored are equal to total coding blocks in the frame where the target slice is located minus the coding blocks that have been decoded currently. It can thus be seen that through this mode, the coding blocks that need to be restored can be effectively determined.

In combination with the technical solution provided in the above first aspect, in some possible implementation modes, the step of determining coding blocks that need to be restored in the frame where the target slice is located based on the type syntax element includes: if a numerical value of the type syntax element does not satisfy a preset condition, parsing a Slice header of the next slice, and determining the coding blocks that need to be restored in the frame where the target slice is located based on a parsing result of the Slice header of the next slice, wherein when the parsing result indicates that the target slice and the next slice do not belong to the same frame, the coding blocks that need to be restored are equal to total coding blocks in the frame where the target slice is located minus coding blocks that have been decoded currently; and when the parsing result indicates that the target slice and the next slice belong to the same frame, the coding blocks that need to be restored are equal to a sequence number of a first coding block of the next slice minus the number of coding blocks that have been decoded currently.

In the embodiments of the present disclosure, when the numerical value of the type syntax element does not satisfy the preset condition, the Slice header of the next slice is parsed, further it can be effectively and accurately determined whether the target slice and the next slice belong to the same frame, further improving the reliability of the determined coding blocks that need to be restored.

In a second aspect, an embodiment of the present disclosure provides a video decoding device, wherein the device includes: a decoding module, configured to decode a target slice of a to-be-decoded video; a detecting module, configured to determine coding blocks that need to be restored in a frame where the target slice is located, when detecting occurrence of an error to a syntax element of the target slice; and a restoring module, configured to restore the coding blocks that need to be restored based on a global preset syntax element template, so as to perform forced decoding of the target slice.

In a third aspect, an embodiment of the present disclosure provides a hardware decoder, for executing the method provided in the embodiments in the above first aspect and/or any possible embodiment with reference to the embodiments in the above first aspect.

In a fourth aspect, an embodiment of the present disclosure further provides a non-volatile computer-readable storage medium (referred to as computer-readable storage medium hereinafter for short), on which a computer program is stored, and when run by a computer, the computer program executes the method provided in the embodiments in the above first aspect and/or any possible embodiment with reference to the embodiments in the above first aspect.

BRIEF DESCRIPTION OF DRAWINGS

In order to illustrate the technical solutions of the embodiments of the present disclosure more clearly, the drawings that need to be used in the embodiments of the present disclosure will be briefly introduced below. It should be understood that the following drawings only show some embodiments of the present disclosure, and therefore should not be regarded as limitation to the scope. For those ordinarily skilled in the art, other related drawings can also be obtained from these drawings without any creative efforts.

DETAILED DESCRIPTION OF EMBODIMENTS

The technical solutions in the embodiments of the present disclosure will be described below with reference to drawings in the embodiments of the present disclosure.

Figure 1:
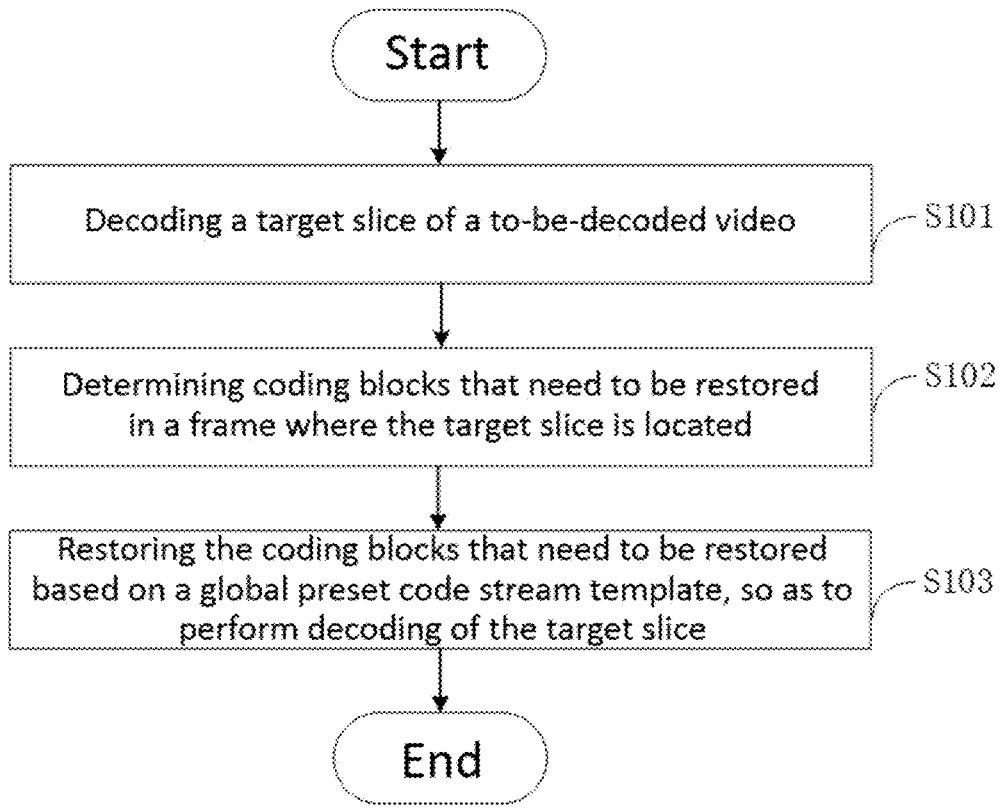
FIG. 1 is a flowchart of steps of a video decoding method provided in an embodiment of the present disclosure.

Referring to FIG. 1, FIG. 1 is a flowchart of steps of a video decoding method provided in an embodiment of the present disclosure. The video decoding method provided in the embodiments of the present disclosure is not limited to an order shown in FIG. 1 or below. The method includes: step S101-step S103.

Step S101: decoding a target slice of a to-be-decoded video.

Figure 2:
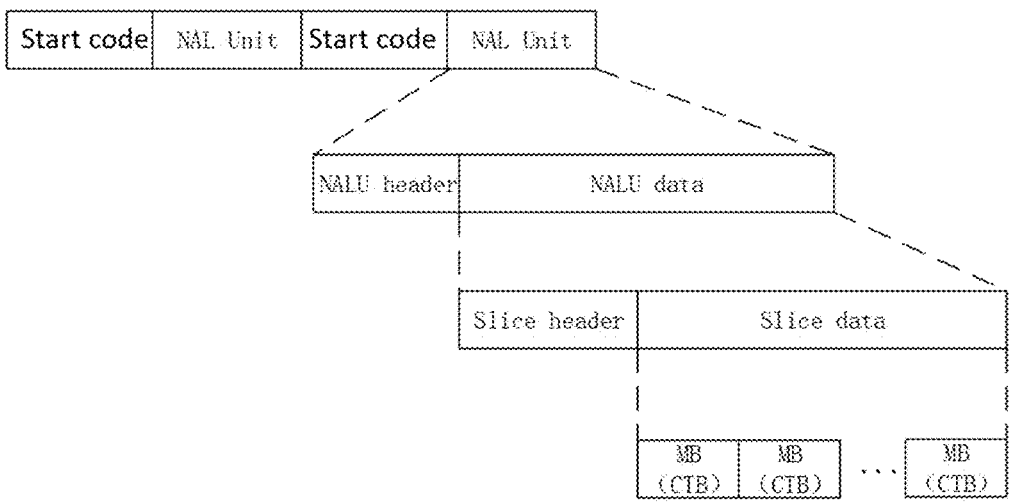
FIG. 2 is a schematic diagram of composition structure of a code stream provided in an embodiment of the present disclosure.

The target slice is any slice in a code stream of the to-be-decoded video. A composition structure of code stream is described below. As shown in FIG. 2, the code stream is composed of a plurality of code stream units, and each code stream unit consists of a start code and an NAL Unit (network abstraction layer unit), i.e., each start code is followed by an NAL Unit. The NAL Unit consists of a NALU header (network abstraction layer unit header) and NALU data (network abstraction layer unit data).

The NALU data may include a Slice header and Slice Data therein. The Slice header and the Slice Data form one slice, and in this step, the slice composed by the Slice header and the Slice Data is decoded.

The Slice header is configured to describe information such as characteristic/attribute of the whole slice. The Slice Data includes coding blocks. Exemplarily, when the H.264 coding standard is used for coding, the coding blocks are macro blocks (MB), and when the HEVC coding standard is used for coding, the coding blocks are coding tree blocks (CTB). In subsequent examples of the present disclosure, the H.264 coding standard and the HEVC coding standard are taken for exemplary descriptions. It could be understood that, the video decoding method provided in the embodiments of the present disclosure is not limited to the two coding standards in the examples.

It should be noted that, the detection of error can be completed in a decoding process.

In an embodiment, in a process of decoding a syntax element by a decoder (which may be a hardware decoder or a software decoder), when the syntax element is out of a range specified by the standards, or the syntax element is obviously contradictory to other syntax elements, or a valid syntax element cannot be decoded from the code stream, it indicates that an error occurs to this syntax element.

In an embodiment, when the decoder decodes the syntax element, the error can be detected by the number of prefix characters of this syntax element.

For detecting the syntax element of the Slice header in the target slice, a detecting process may specifically include: judging whether the number of prefixes 0 of a first syntax element is greater than a preset threshold corresponding to the first syntax element, wherein when a syntax element with the number of prefixes 0 greater than the preset threshold corresponding to the first syntax element exists in the first syntax element, an error occurs to this syntax element. Otherwise, no error occurs to this syntax element.

In the above, the first syntax element is a syntax element based on Exponential-Golomb coding in the Slice header in the target slice. That is, this detecting manner only needs to count the number of prefixes 0 of the syntax element based on Exponential-Golomb coding, and this mode has high efficiency and occupies fewer resources, which is beneficial to hardware implementation.

Taking that the H.264 coding standard is used for coding as an example, reference can be made to Table 1 for the first syntax elements and respective corresponding preset thresholds.

TABLE 1

| H.264 syntax element slice_header( ) | The number of prefixes 0 |
| --- | --- |
| first_mb_in_slice | >17 |
| slice_type | >3 |
| pic_parameter_set_id | >8 |
| idr_pic_id | >16 |
| redundant_pic_cnt | >7 |
| luma_log2_weight_denom | >3 |
| chroma_log2_weight_denom | >3 |
| luma_weight_l0 | >8 |
| luma_offset_l0 | >8 |
| chroma_weight_l0 | >8 |
| chroma_offset_l0 | >8 |
| luma_weight_l1 | >8 |
| luma_offset_l1 | >8 |
| chroma_weight_l1 | >8 |
| chroma_offset_l1 | >8 |
| modification_of_pic_nums_idc | >2 |
| abs_diff_pic_num_minus1 | >17 |
| long_term_pic_num | >5 |
| abs_diff_view_idx_minus1 | >4 |
| num_ref_idx_l0_active_minus1 | >5 |
| num_ref_idx_l1_active_minus1 | >5 |
| cabac_init_idc | >1 |
| slice_qp_delta | >6 |
| disable_deblocking_filter_idc | >1 |
| slice_alpha_c0_offset_div2 | >3 |
| slice_beta_offset_div2 | >3 |

The first column in Table 1 represents the first syntax elements, and the second column in Table 1 represents the preset thresholds corresponding to respective first syntax elements. For example, the preset threshold corresponding to first syntax element slice_type is 3. Exemplarily, before the hardware decoder decodes the first syntax element slice_type, it is firstly judged whether the number of prefixes 0 of slice_type is greater than 3, and if greater, an error occurs to slice_type.

In the above, the first syntax elements shown in Table 1 are only examples, and are not used as limitation.

Taking that the HEVC coding standard is used for coding as an example, reference can be made to Table 2 for the first syntax elements and respective corresponding preset thresholds.

TABLE 2

| HEVC syntax element slice_header( ) | The number of prefixes 0 |
| --- | --- |
| slice_pic_parameter_set_id | >6 |
| slice_type | >1 |
| num_ref_idx_l0_active_minus1 | >3 |
| num_ref_idx_l1_active_minus1 | >3 |
| collocated_ref_idx | >3 |
| five_minus_max_num_merge_cand | >2 |
| delta_luma_weight_l0 | >8 |
| luma_offset_l0 | >8 |
| delta_chroma_weight_l0 | >8 |
| delta_chroma_offset_l0 | >10 |
| delta_luma_weight_l1 | >8 |
| luma_offset_l1 | >8 |
| delta_chroma_weight_l1 | >8 |
| delta_chroma_offset_l1 | >10 |
| luma_log2_weight_denom | >3 |
| delta_chroma_log2_weight_denom | >3 |
| slice_qp_delta | >6 |
| slice_cb_qp_offset | >6 |
| slice_cr_qp_offset | >6 |
| slice_beta_offset_div2 | >3 |
| slice_tc_offset_div2 | >3 |
| num_entry_point_offsets | >8 |
| offset_len_minus1 | >5 |
| slice_segment_header_extension_length | >8 |

The first column in Table 2 represents the first syntax elements, and the second column in Table 2 represents the preset thresholds corresponding to respective first syntax elements. For example, the preset threshold corresponding to first syntax element slice_type is 1. Exemplarily, before the hardware decoder decodes the first syntax element slice_type, it is firstly judged whether the number of prefixes 0 of slice_type is greater than 1, and if greater, an error occurs to slice_type.

In the above, the first syntax elements shown in Table 2 are only examples, and are not used as limitation.

Besides, it should be noted that, the preset thresholds respectively corresponding to the first syntax elements in the above are determined by the coding standard. That is, the preset thresholds corresponding to different first syntax elements in different coding standards are determined by respective coding standards themselves.

It should be noted that, after it is detected that an error occurs to a certain syntax element of the Slice header in the target slice, detection and decoding of subsequent syntax elements are stopped, and step S102 is executed. Through this mode, the efficiency of hardware decoding can be improved.

For detecting a syntax element of a coding block in the target slice, a detecting process may specifically include: judging whether the number of prefixes 1 of a second syntax element is greater than a preset threshold corresponding to the second syntax element, wherein when a syntax element with the number of prefixes 1 greater than the preset threshold corresponding to the second syntax element exists in the second syntax element, an error occurs to this syntax element. Otherwise, no error occurs to this syntax element.

In the above, the second syntax element is a syntax element based on CABAC coding in the coding block in the target slice. That is, this detecting manner only needs to count the number of prefixes 1 of the syntax element based on CABAC coding, and this manner has high efficiency and occupies few resources, which is beneficial to hardware implementation.

Taking that the H.264 coding standard is used for coding as an example, reference can be made to Table 3 for the second syntax elements and respective corresponding preset thresholds.

TABLE 3

| H264 syntax element slice_data( ) | The number of prefixes 1 |
|---|---|
| mb_qp_delta | >64 |
| coeff_abs_level_minus1 | >16 (only count prefixes 1 of K-th order Exponential-Golomb coding part) |
| mvd_l0 | >11 (only count prefixes 1 of K-th order Exponential-Golomb coding part) |
| mvd_l1 | >11 (only count prefixes 1 of K-th order Exponential-Golomb coding part) |

The first column in Table 3 represents the second syntax elements, and the second column in Table 3 represents the preset thresholds corresponding to respective second syntax elements. For example, the preset threshold corresponding to second syntax element mb_qp_delta is 64. Exemplarily, when the hardware decoder decodes the second syntax element mb_qp_delta, in the decoding process, it is judged whether the number of prefixes 1 of mb_qp_delta decoded is greater than 64, and if greater, an error occurs to mb_qp_delta.

In the above, the second syntax elements shown in Table 3 are only examples, and are not used as limitation.

It should be noted that, the CABAC-coded syntax element is coded by a dedicated CABAC coding engine, and in turn, the CABAC-coded syntax element is decoded by a dedicated CABAC decoding engine. In a decoding process, the number of prefixes appearing is judged, i.e., all that before digit 0 are prefixes of this syntax element, and when 0 appears in the decoding, the counted number of 1 before 0 is just the number of prefixes 1 of this syntax element. The above K-th order Exponential-Golomb coding is a coding manner of the CABAC coding engine.

Taking that the HEVC coding standard is used for coding as an example, reference can be made to Table 4 for the second syntax elements and respective corresponding preset thresholds.

TABLE 4

| HEVC syntax element slice_data( ) | The number of prefixes 1 |
|---|---|
| coeff_abs_level_rem | >23 |
| cu_qp_delta | >7 (only count prefixes 1 of K-th order Exponential-Golomb coding part) |
| abs_mvd_minus2 | >15 (only count prefixes 1 of K-th order Exponential-Golomb coding part) |

The first column in Table 4 represents the second syntax elements, and the second column in Table 4 represents the preset thresholds corresponding to respective second syntax elements. For example, the preset threshold corresponding to second syntax element coeff_abs_level_rem is 23. Exemplarily, when the hardware decoder decodes the second syntax element coeff_abs_level_rem, in the decoding process, it is judged whether the number of prefixes 1 of the coeff_abs_level_rem decoded is greater than 23, and if greater, an error occurs to coeff_abs_level_rem.

In the above, the second syntax elements shown in Table 4 are only examples, and are not used as limitation.

Besides, it should be noted that, the preset thresholds respectively corresponding to the second syntax elements in the above are determined by the coding standard. That is, the preset thresholds corresponding to different second syntax elements in different coding standards are determined by the respective coding standards themselves.

It should be noted that, after it is detected that an error occurs to a certain syntax element of a coding block in the target slice, detection and decoding of subsequent syntax elements are stopped, at this time, the coding block to which the error occurs needs to be restored, and after the erroneous coding block is restored, step S102 is executed.

In the embodiments of the present disclosure, when it is detected that an error occurs to the syntax element of the coding block in the target slice, this syntax element is corrected by a local preset syntax element template, and meanwhile, a preset code stream template is read, so as to perform forced decoding of this coding block.

That is, when it is detected that an error occurs to the syntax element of the coding block in the target slice, the decoder then can enter a set partial coding block restoration mode, wherein firstly, this syntax element is corrected by the local preset syntax element template, decoding is continued from the erroneous syntax element, if an error occurs to a subsequent syntax element again, the subsequent syntax element continues to be corrected by the local preset syntax element template, until the decoding of the current erroneous coding block is completed, that is, the decoder will not stop operation because of an error in the coding block. In this process, the hardware decoder will not consume a real code stream, but directly reads a pseudo code stream, and such pseudo code stream is just the above preset code stream template.

In an embodiment, the preset code stream template may include an all-1 template, an all-0 template, or certain other preset binary bit string templates, for example, a binary bit string template including both 1 and 0, which is not limited in the present disclosure.

In an embodiment, after reading the preset code stream template, this method further includes: in response to a syntax element where an error occurs further existing in to-be-decoded coding block, reading a preset value of the syntax element corresponding to the syntax element where an error occurs in the local preset syntax element template.

That is, when an error still occurs to a local syntax element after reading the preset code stream template, the preset local preset syntax element template can be used to continue error correction, so that the decoding of the coding block is completed. The local preset syntax element template can be set according to different syntax elements, which is not limited in the present disclosure.

It can be seen that, in the embodiments of the present disclosure, after the preset code stream template is read, if a syntax element where an error occurs still exists in the coding block, the syntax element where the error occurs is directly set to a corresponding value in the local preset syntax element template, so as to realize forced decoding of the coding block.

Figure 3:
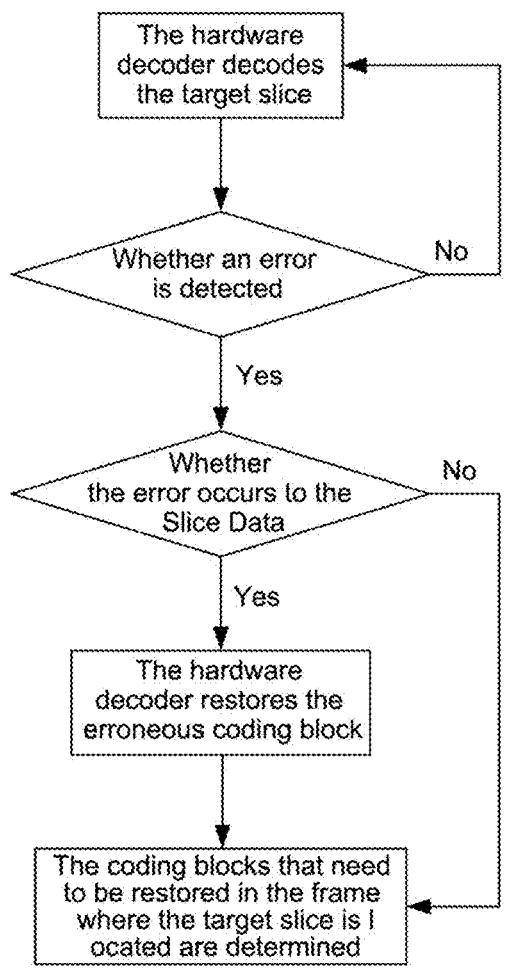
FIG. 3 is a flowchart of steps of a video decoding method provided in another embodiment of the present disclosure.

The above process is described below with reference to FIG. 3. Taking the hardware decoder as an example, the hardware decoder decodes the target slice, and judges whether an error is detected, and if no error occurs, the hardware decoder continues to decode the next slice. If an error occurs, the hardware decoder judges whether the error occurs to the Slice Data (i.e., judging whether the error occurs to the coding block), and if so, the hardware decoder forcibly decodes the coding block, i.e., restoring the erroneous coding block, and after the hardware decoder forcibly decodes the coding block, step S102 is executed, and if no error occurs to the Slice Data, step S102 is directly executed.

In addition, when no syntax element error is detected in the target slice, the next slice continues to be decoded, without the need of executing subsequent steps.

Step S102: determining coding blocks that need to be restored in a frame where the target slice is located.

When a syntax element error is detected in the target slice, the coding blocks that need to be restored in the frame where the target slice is located need to be determined.

Optionally, the step of determining coding blocks that need to be restored in a frame where the target slice is located includes: judging whether a start code exists in a code stream behind the target slice; and if no start code exists in the code stream behind the target slice, determining the coding blocks that need to be restored in the frame where the target slice is located.

In the above, the coding blocks that need to be restored are equal to total coding blocks in the frame where the target slice is located minus coding blocks that have been decoded currently.

It should be noted that, if no start code exists in the code stream behind the target slice, it is considered that one frame ends, at this time, it can be determined that the coding blocks that need to be restored are equal to the total coding blocks in the frame in which the target slice is located minus the coding blocks that have been decoded currently. It can be seen that, through this mode, the coding blocks that need to be restored can be effectively determined.

Herein, the coding blocks that need to be restored can be determined according to the number, for example, if the total coding blocks in the frame where the target slice is located is 100, and the number of coding blocks that have been decoded currently is 80, the number of coding blocks that need to be restored is 20, and in this case, 20 coding blocks behind a position of the target slice where the error occurs are the coding blocks that need to be restored.

Optionally, if a start code exists in a code stream behind the target slice, a network abstraction layer unit header corresponding to the start code is decoded to obtain a type syntax element in the network abstraction layer unit header; and the coding blocks that need to be restored in the frame where the target slice is located are determined based on the type syntax element.

Specifically, the above step of determining the coding blocks that need to be restored in the frame where the target slice is located based on the type syntax element includes: determining, if a numerical value of the type syntax element satisfies a preset condition, the coding blocks that need to be restored in the frame where the target slice is located, wherein the coding blocks that need to be restored are equal to the total coding blocks in the frame where the target slice is located minus the coding blocks that have been decoded currently; if the numerical value of the type syntax element satisfies the preset condition, it indicates that the target slice and the next slice do not belong to the same frame; and the next slice is a slice in the network abstraction layer unit corresponding to the start code.

That is, if the start code is found in the code stream behind the target slice, the NALU header (network abstraction layer unit header) is decoded to obtain a type syntax element Nal Unit type.

Taking that the H.264 coding standard is used for coding as an example, the preset condition may include:
condition 1: a current frame is an IDR (Instantaneous Decoder Refresh) frame, and a numerical value of NAL Unit type is not equal to 5; and
condition 2: a current frame is a non-IDR frame, and NAL Unit type is equal to 5.

It should be noted that a first image frame of a frame sequence is an IDR frame, and the IDR frame is one special I frame in the frame sequence. The non-IDR frame includes other I frames in the frame sequence, and P frame and B frame in the frame sequence.

The above I frame represents key frame, and a picture of this frame is integrally reserved; and decoding can be completed just with data of this frame. The P frame is a forward predictive coded frame. The P frame represents a difference between this frame and a previous key frame (or P frame), and a previously cached picture needs to be superposed with the difference defined by this frame in the decoding, to generate a final picture. The B frame is a bi-directional predictive interpolated coding frame. The B frame is a bi-directional predictive frame, and the B frame records a difference between this frame and previous and next frames.

When the Nal Unit type meets one of the above two conditions, it indicates that the target slice and the next slice do not belong to the same frame (the Nal Unit type indicates one type of network abstraction layer unit), and at this time, it is determined that the coding blocks that need to be restored in the frame where the target slice is located are equal to the total coding blocks in the frame where the target slice is located minus the coding blocks that have been decoded currently.

Taking that the HEVC coding standard is used for coding as an example, the preset condition may include:
condition 1: the Nal Unit type is greater than 21;
condition 2: the current frame is an IDR/BLA (Broken Link Access)/CRA (Clean Random Access) frame, and the Nal Unit type is smaller than 16; and
condition 3: the current frame is a non-IDR/BLA/CRA frame, and the NAL Unit type is greater than or equal to 16.

It should be noted that the IDR frame, the BLA frame, and the CRA frame are all random access point images, and all belong to the I frame.

When the Nal Unit type satisfies one of the above three conditions, it indicates that the target slice and the next slice do not belong to the same frame, and the next slice is start of a new frame, in this case, it is determined that the coding blocks that need to be restored in the frame where the target slice is located are equal to total coding blocks in the frame where the target slice is located minus the coding blocks that have been decoded currently.

In the embodiments of the present disclosure, if a start code exists in the code stream behind the target slice, a type syntax element of corresponding network abstraction layer unit is obtained by decoding, and when a numerical value of the type syntax element satisfies the preset condition, it indicates that the target slice and the next slice do not belong to the same frame, in this case, it can be determined that the coding blocks that need to be restored are equal to total coding blocks in the frame where the target slice is located minus the coding blocks that have been decoded currently. It can thus be seen that through this mode, the coding blocks that need to be restored can be effectively determined.

Optionally, if the numerical value of the type syntax element does not satisfy the preset condition, the Slice header of the next slice is parsed, and the coding blocks that need to be restored in the frame where the target slice is located are determined based on a parsing result of the Slice header of the next slice.

In the above, when the parsing result indicates that the target slice and the next slice do not belong to the same frame, that is, the parsing result indicates that the next slice is start of a new frame, the coding blocks that need to be restored are equal to the total coding blocks in the frame where the target slice is located minus the coding blocks that have been decoded currently; and when the parsing result indicates that the target slice and the next slice belong to the same frame, the coding blocks that need to be restored are equal to a sequence number of a first coding block of the next slice minus the number of coding blocks that have been decoded currently. In the above, the sequence number of the first coding block of the next slice can be obtained from the syntax element in the next Slice header.

That is, the Slice header of the next slice continues to be decoded.

Taking that the H.264 coding standard is used for coding as an example, a specific process of determining the coding blocks that need to be restored in a frame where the target slice is located may include:

step S201: decoding the syntax element first_mb_in_slice, wherein if this value is less than the number of macro blocks that have been decoded, it indicates that the target slice and the next slice do not belong to the same frame (first_mb_in_slice indicates sequence number of the first coding block corresponding to the slice), then the coding blocks that need to be restored are equal to the total coding blocks in the frame where the target slice is located minus the coding blocks that have been decoded currently, otherwise, proceeding to step S202;

step S202: decoding the syntax element slice_type, wherein if the current frame is an IDR frame but the slice type is not I slice, it indicates that the target slice and the next slice do not belong to the same frame (slice_type indicates slice type of the slice), then the coding blocks that need to be restored are equal to the total coding blocks in the frame where the target slice is located minus the coding blocks that have been decoded currently, otherwise, proceeding to step S203;

step S203: decoding the syntax element pic_parameter_set_id, wherein if this value is not equal to pic_parameter_set_id corresponding to the slice header before the error occurs, it indicates that the target slice and the next slice do not belong to the same frame (pic_parameter_set_id indicates a picture parameter set sequence number corresponding to the slice, and for all slices of the same frame, this value must be the same), then the coding blocks that need to be restored are equal to the total coding blocks in the frame where the target slice is located minus the coding blocks that have been decoded currently, otherwise, proceeding to step S204; and if the erroneous slice is a first slice in one frame, directly proceeding to step S204;

step S204: decoding a syntax element frame_num, wherein if this value is not equal to frame_num corresponding to the slice header before the error occurs, it indicates that the target slice and the next slice do not belong to the same frame (frame_num indicates a frame serial number corresponding to the slice, and for all slices of the same frame, this value must be the same), then the coding blocks that need to be restored are equal to the total coding blocks in the frame where the target slice is located minus the coding blocks that have been decoded currently, otherwise, proceeding to step S205; and if the erroneous slice is a first slice in one frame, directly proceeding to step S205;

step S205: decoding the syntax element idr_pic_id, wherein if this value is not equal to idr_pic_id corresponding to the slice header before the error occurs, it indicates that the target slice and the next slice do not belong to the same frame (idr_pic_id indicates an IDR image identification number corresponding to the slice, and for all slices of the same frame, this value must be the same), then the coding blocks that need to be restored are equal to the total coding blocks in the frame where the target slice is located minus the coding blocks that have been decoded currently, otherwise, proceeding to step S206; and if the erroneous slice is a first slice in one frame, directly proceeding to step S206; and step S206: determining that the target slice and the next slice belong to the same frame, then the coding blocks that need to be restored are equal to the total coding blocks in the frame where the target slice is located before the next slice minus the coding blocks that have been decoded currently, that is, the coding blocks that need to be restored are equal to first_mb_in_slice minus the coding blocks that have been decoded currently.

Taking that the HEVC coding standard is used for coding as an example, a specific process of determining coding blocks that need to be restored in a frame where the target slice is located may include:

step S301: decoding a syntax element first_slice_segment_in_pic_flag, wherein if this value is 1 and the number of macro blocks that have been decoded is greater than 0, it indicates that the target slice and the next slice do not belong to the same frame (first_slice_segment_in_pic_flag indicates whether the slice is a first slice in one frame), then the coding blocks that need to be restored are equal to the total coding blocks in the frame where the target slice is located minus the coding blocks that have been decoded currently, otherwise, proceeding to step S302;

step S302: decoding the syntax element slice_pic_parameter_set_id, wherein if this value is not equal to slice_pic_parameter_set_id corresponding to the slice header before the error occurs, it indicates that the target slice and the next slice do not belong to the same frame (slice_pic_parameter_set_id indicates a picture parameter set sequence number corresponding to the slice, and for all slices of the same frame, this value must be the same), then the coding blocks that need to be restored are equal to the total coding blocks in the frame where the target slice is located minus the coding blocks that have been decoded currently, otherwise, proceeding to step S303; and if the erroneous slice is a first slice in one frame, directly proceeding to step S303;

step S303: decoding a syntax element slice_segment_address, wherein if a macro block position corresponding to this value has been successfully decoded, it indicates that the target slice and the next slice do not belong to the same frame (slice_segment_address indicates a sequence number of the first coding block corresponding to the slice), then the coding blocks that need to be restored are equal to the total coding blocks in the frame where the target slice is located minus the coding blocks that have been decoded currently, otherwise, proceeding to step S304;

step S304: decoding the syntax element slice_type, wherein if the current frame is an IDR/BLA/CRA frame but the slice type is not an I slice, it indicates that the target slice and the next slice do not belong to the same frame (slice_type indicates slice type of the slice), then the coding blocks that need to be restored are equal to the total coding blocks in the frame where the target slice is located minus the coding blocks that have been decoded currently, otherwise, proceeding to step S305; and step S305: determining that the target slice and the next slice belong to the same frame, then the coding blocks that need to be restored are equal to the total coding blocks in the frame where the target slice is located before the next slice minus the coding blocks that have been decoded currently, that is, the coding blocks that need to be restored are equal to slice_segment_address minus the coding blocks that have been decoded currently.

To sum up, in the embodiments of the present disclosure, when the numerical value of the type syntax element of the network abstraction layer unit does not satisfy the preset condition, the Slice header of the next slice is decoded, further it can be effectively and accurately determined whether the target slice and the next slice belong to the same frame, further improving the reliability of the determined coding blocks that need to be restored.

Figure 4:
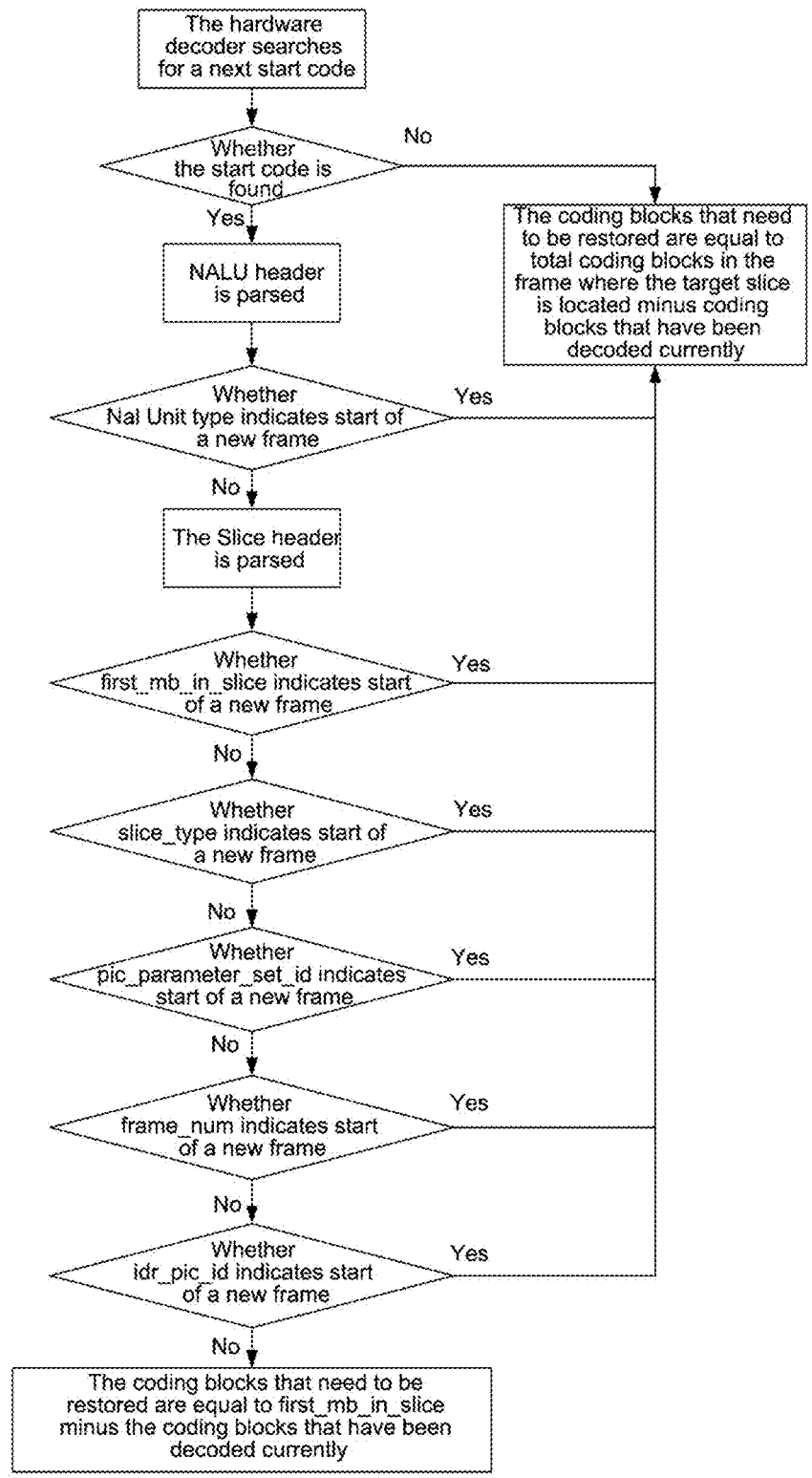
FIG. 4 is a schematic flowchart of determining coding blocks that need to be restored provided in an embodiment of the present disclosure.

Referring to FIG. 4, taking that the H.264 coding standard is used for coding and that the decoder is a hardware decoder as an example, an achieving process of determining the coding blocks that need to be restored may include that: the hardware decoder searches for a next start code, if the next start code is found, the NALU header is parsed, and it is judged whether the Nal Unit type indicates start of a new frame, wherein if yes, the coding blocks that need to be restored are equal to the total coding blocks in the frame where the target slice is located minus the coding blocks that have been decoded currently; and if no, the Slice header is parsed, and it is judged whether first_mb_in_slice indicates start of a new frame, wherein if yes, the coding blocks that need to be restored are equal to the total coding blocks in the frame where the target slice is located minus the coding blocks that have been decoded currently; and if no, it is judged whether slice_type indicates start of a new frame, wherein if yes, the coding blocks that need to be restored are equal to the total coding blocks in the frame where the target slice is located minus the coding blocks that have been decoded currently; and if no, it is judged whether pic_parameter_set_id indicates start of a new frame, wherein if yes, the coding blocks that need to be restored are equal to the total coding blocks in the frame where the target slice is located minus the coding blocks that have been decoded currently; and if no, it is judged whether frame_num indicates start of a new frame, wherein if yes, the coding blocks that need to be restored are equal to the total coding blocks in the frame where the target slice is located minus the coding blocks that have been decoded currently; and if no, it is judged whether idr_pic_id indicates start of a new frame, wherein if yes, the coding blocks that need to be restored are equal to the total coding blocks in the frame where the target slice is located minus the coding blocks that have been decoded currently; and if no, the coding blocks that need to be restored are equal to first_mb_in_slice minus the coding blocks that have been decoded currently.

Figure 5:
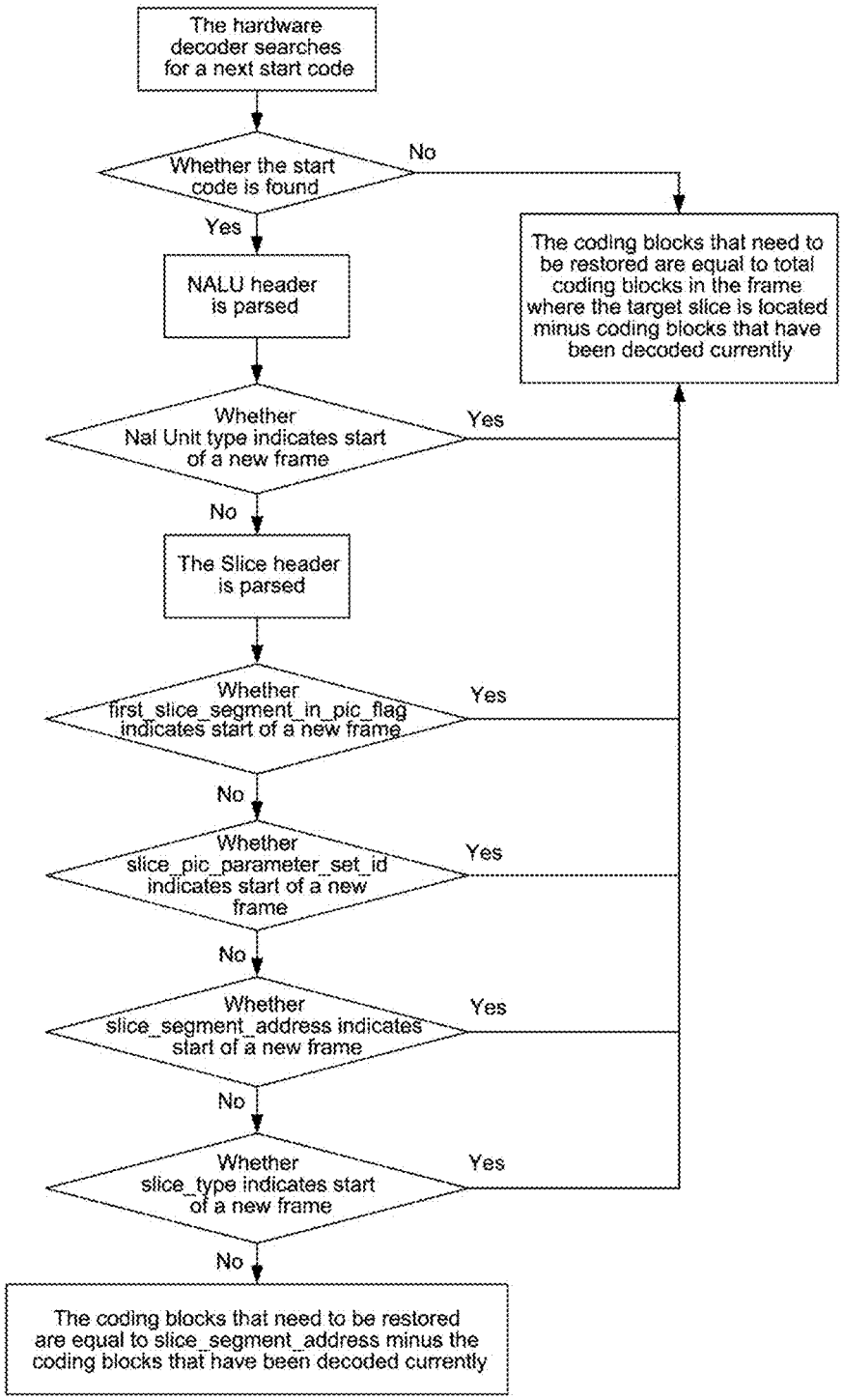
FIG. 5 is a schematic flowchart of determining coding blocks that need to be restored provided in another embodiment of the present disclosure.

Referring to FIG. 5, taking that the HEVC coding standard is used for coding and that the decoder is a hardware decoder as an example, an achieving process of determining the coding blocks that need to be restored may include that: the hardware decoder searches for a next start code, if the next start code is found, the NALU header is parsed, and it is judged whether the Nal Unit type indicates start of a new frame, wherein if yes, the coding blocks that need to be restored are equal to the total coding blocks in the frame where the target slice is located minus the coding blocks that have been decoded currently; and if no, the Slice header is parsed, and it is judged whether first_slice_segment_in_pic_flag indicates start of a new frame, wherein if yes, the coding blocks that need to be restored are equal to the total coding blocks in the frame where the target slice is located minus the coding blocks that have been decoded currently; and if no, it is judged whether slice_pic_parameter_set_id indicates start of a new frame, wherein if yes, the coding blocks that need to be restored are equal to the total coding blocks in the frame where the target slice is located minus the coding blocks that have been decoded currently; and if no, it is judged whether slice_segment_address indicates start of a new frame, wherein if yes, the coding blocks that need to be restored are equal to the total coding blocks in the frame where the target slice is located minus the coding blocks that have been decoded currently; and if no, it is judged whether slice_type indicates start of a new frame, wherein if yes, the coding blocks that need to be restored are equal to the total coding blocks in the frame where the target slice is located minus the coding blocks that have been decoded currently; and if no, the coding blocks that need to be restored are equal to slice_segment_address minus the coding blocks that have been decoded currently.

Step S103: restoring the coding blocks that need to be restored based on a global preset syntax element template, so as to perform decoding of the target slice.

After the coding blocks that need to be restored are determined, the coding blocks that need to be restored are restored based on the global preset syntax element template, so as to perform the decoding of the target slice.

First, a process of constructing the global preset syntax element template is illustrated, and the constructing process may specifically include: determining a preset value according to a meaning indicated by a key syntax element, wherein the key syntax element is configured to determine a fixed decoding branch; and assigning a value to the key syntax element according to the determined preset value, to obtain the global preset syntax element template.

It should be noted that the key syntax element can ensure that a fixed decoding branch is selected from a plurality of decoding branches, and ensure that each coding block performs the decoding according to the fixed decoding branch, thereby causing no interruption to the decoding, and improving the hardware decoding efficiency. Therefore, it only needs to assign a value to the key syntax element herein.

For the preset syntax element template of the Slice header, see a table below:

| H264 slice header preset syntax element slice_header( ) | Preset value |
|---|---|
| first_mb_in_slice | The number of coding blocks having been decoded |
| slice_type | Set to be 0 if the current frame contains a valid reference frame, otherwise set to be 1 |

-continued

| HEVC slice header preset syntax element slice_header( ) | Preset value |
|---|---|
| slice_segment_address | The number of coding blocks having been decoded |
| slice_type | Set to be 0 if the current frame contains a valid reference frame, otherwise set to be 1 |
| slice_cb_qp_offset | pps_cb_qp_offset |
| slice_cr_qp_offset | pps_cr_qp_offset |
| slice_deblocking_filter_disabled_flag | pps_deblocking_filter_disable_flag |
| slice_beta_offset_div2 | pps_beta_offset_div2 |
| slice_tc_offset_div2 | pps_tc_offset_div2 |
| slice_loop_filter_across_slices_enabled_flag | pps_loop_filter_across_slices_enabled_flag |

It should be noted that all syntax elements with pps as prefix denote a syntax element of a picture parameter set to which the current frame belongs.

The picture parameter set is configured to describe common information on a plurality of coded images, and is also transmitted via the network abstraction layer unit, and a value of corresponding type syntax element (NAL unit type) is 8.

It should be noted that, the preset values of the slice header syntax elements that are not listed in the table are all 0.

The restoring process in step S103 further may specifically include: combining the coding blocks that need to be restored into a new slice for restoration, so as to complete the decoding of the target slice.

In the above, values are assigned to syntax elements of the Slice header and the Slice Data corresponding to the new slice by the global preset syntax element template. That is, in an embodiment, the key syntax element may include the syntax elements of the Slice header and the syntax elements of the coding blocks.

The slice type of the new slice is determined by whether the frame where the target slice is located includes a reference frame. That is, if a reference frame list corresponding to the frame where the target slice is located contains a valid reference frame, the slice type is set to be P slice, otherwise, I slice.

For the preset syntax element template of the H264 Slice Data, see the table below:

| H264 Slice Data preset syntax element slice_data( ) | Preset value |
|---|---|
| mb_skip_flag | 1 |
| mb_type | 3(I_16 × 16_2_0_0) |
| mb_qp_delta | 0 |
| intra_chroma_pred_mode | 0(DC) |

For the preset syntax element template of the HEVC Slice Data, see the table below:

| HEVC Slice Data preset syntax element slice_data( ) | Preset value |
|---|---|
| split_cu_flag | 0 |
| cu_transquant_bypass_flag | 0 |
| cu_skip_flag | 1 |
| part_mode | 0(PART_2N × 2N) |
| prev_intra_luma_pred_flag | 0 |
| rem_intra_luma_pred_mode | 1 |
| intra_chroma_pred_mode | 4 |

-continued

| HEVC Slice Data preset syntax element slice_data( ) | Preset value |
|---|---|
| rqt_root_cbf | 1 |
| merge_idx | 0 |
| split_transform_flag | 0 |
| cbf_cb | 0 |
| cbf_cr | 0 |
| cbf_luma | 0 |

It should be noted that the global preset syntax element template and the local preset syntax element template in a restoration process of partial coding blocks have differences as follows.

1. The global preset syntax element template contains the syntax elements of the Slice header and the Slice Data, and the key syntax element in the syntax elements of the Slice header and the Slice Data is preset, for example, including, but not limited to, presetting value for the key syntax element described in the above tables. In the above, it can be ensured that a fixed decoding branch is selected from a plurality of decoding branches according to the key syntax element, guaranteeing that each coding block is decoded according to the fixed decoding branch, thus causing no interruption to the decoding and improving the hardware decoding efficiency.

2. The local preset syntax element template only contains the syntax elements of the Slice Data, and all the syntax elements in the Slice Data are preset, to ensure that after reading all-0 or all-1 or other binary-sequence code stream templates, once any syntax element has an error in the decoding process, it always can be corrected by the preset value of corresponding syntax element in the local preset syntax element template, so as to realize forced decoding of some erroneous coding blocks.

It can thus be seen that in the embodiments of the present disclosure, by combining the coding blocks that need to be restored into a new slice for restoration, and meanwhile, assigning values to the Slice header and the Slice Data corresponding to the new slice by the global preset syntax element template, the hardware pipeline will not be destroyed, and the hardware decoding efficiency is improved. Moreover, the slice type of the new slice is determined by whether the frame where the target slice is located contains a reference frame, i.e., when the frame where the target slice is located contains the reference frame, the new slice can also be restored based on the reference frame, and through this mode, the visual effect of restored coding blocks can be improved.

To sum up, in the embodiments of the present disclosure, the target slice of the to-be-decoded video is decoded, and when it is detected that an error occurs to the syntax element of the target slice, the coding blocks that need to be restored in the frame where the target slice is located are determined; then, the coding blocks that need to be restored are forcibly decoded based on one global preset syntax element template. Through this mode, the erroneous coding blocks can be timely restored without destroying the hardware pipeline (i.e., the hardware is not interrupted when an error is detected). That is, this mode can realize the code stream error detection and restoration based on hardware only by increasing quite few hardware logics, has low complexity, and will not reduce the hardware decoding efficiency.

When the video decoding method provided in the above embodiments is applied to specific decoding, reference can be made to FIG. 6 to FIG. 9 for comparison views of decoding visual effects.

Figure 6:
FIG. 6 is a schematic view when an error occurs to a slice of I frame provided in an embodiment of the present disclosure.
Figure 7:
FIG. 7 is a restored view after the error occurs to the slice of the I frame in FIG. 6.
Figure 8:
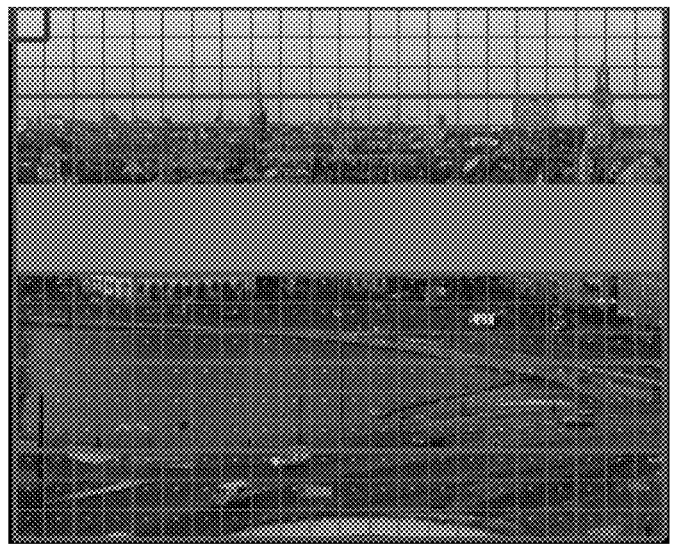
FIG. 8 is a schematic view when an error occurs to a slice of P frame provided in an embodiment of the present disclosure.
Figure 9:
FIG. 9 is a restored view after an error occurs to the slice of the P frame in FIG. 8.

In the above, FIG. 6 is a schematic view when an error occurs to the slice of I frame. FIG. 7 is a corresponding restored view after the error occurs to the slice of the I frame in FIG. 6. FIG. 8 is a schematic view when an error occurs to the slice of P frame. FIG. 9 is a corresponding restored view after an error occurs to the slice of the P frame in FIG. 8.

It should be noted that square blocks in FIG. 6 and FIG. 8 are coding blocks. Every three rows of coding blocks constitute one slice. Erroneous coding blocks are at the bottom of FIG. 6, and since FIG. 6 is a key frame, it cannot be completely restored when an error occurs to the coding blocks thereof. Erroneous coding blocks are in the middle of FIG. 8, and since FIG. 8 is a forward predictive coded frame, it can be restored according to the previous key frame, and therefore, the erroneous coding blocks thereof can be completely restored.

Based on the same inventive concept, an embodiment of the present disclosure further provides a video decoding device, wherein the device includes:

a decoding module, configured to decode a target slice of a to-be-decoded video;

a detecting module, configured to determine coding blocks that need to be restored in a frame where the target slice is located, when detecting occurrence of an error to a syntax element of the target slice; and a restoring module, configured to restore the coding blocks that need to be restored based on a global preset syntax element template, so as to perform forced decoding of the target slice.

Optionally, the device further includes a constructing module, wherein the constructing module is configured to determine a preset value according to a meaning indicated by a key syntax element, the key syntax element being configured to determine a fixed decoding branch; and assign a value to the key syntax element according to the determined preset value, to obtain the global preset syntax element template.

Optionally, the key syntax element includes a syntax element of a Slice header and a syntax element of coding blocks.

Optionally, the restoring module is specifically configured to combine the coding blocks that need to be restored into a new slice; restore the new slice based on the global preset syntax element template, wherein in a restoring process, a slice type of the new slice is determined by whether the frame where the target slice is located includes a reference frame.

Optionally, occurrence of an error to a syntax element of the target slice includes occurrence of an error to the syntax element of the Slice header in the target slice.

Optionally, the detecting module is further specifically configured to, when detecting that a syntax element with the number of prefixes 0 greater than a preset threshold corresponding to the first syntax element exists in the first syntax element, determine that an error occurs to this syntax element, wherein the first syntax element is a syntax element based on Exponential-Golomb coding in the Slice header in the target slice.

Optionally, the detecting module is further specifically configured to, when detecting that an error occurs to the syntax element of the coding block in the target slice, read a local preset syntax element to correct this syntax element, and meanwhile read a preset code stream template, so as to perform forced decoding of this coding block; and determine coding blocks that need to be restored in the frame where the target slice is located.

Optionally, the detecting module is further specifically configured to, after reading the preset code stream template, read a local preset syntax element template corresponding to the syntax element where an error occurs, in response to a syntax element where an error occurs further existing in a to-be-decoded coding block.

Optionally, the detecting module is further specifically configured to, when detecting that a syntax element with the number of prefixes 1 greater than a preset threshold corresponding to a second syntax element exists in the second syntax element, determine that an error occurs to this syntax element, wherein the second syntax element is a syntax element based on CABAC coding in the coding blocks in the target slice.

Optionally, the preset threshold is determined by a coding standard corresponding to each syntax element.

Optionally, the detecting module is further specifically configured to, if detecting that no start code exists in the code stream behind the target slice, determine the coding blocks that need to be restored in the frame where the target slice is located, wherein the coding blocks that need to be restored are equal to total coding blocks in the frame where the target slice is located minus coding blocks that have been decoded currently.

Optionally, the detecting module is further specifically configured to, if detecting that a start code exists in the code stream behind the target slice, decode the network abstraction layer unit header corresponding to the start code, to obtain a type syntax element in the network abstraction layer unit header; and based on the type syntax element, determine the coding blocks that need to be restored in the frame where the target slice is located.

Optionally, the detecting module is further specifically configured to, if a numerical value of the type syntax element satisfies a preset condition, determine the coding blocks that need to be restored in the frame where the target slice is located, wherein the coding blocks that need to be restored are equal to total coding blocks in the frame where the target slice is located minus coding blocks that have been decoded currently; if the numerical value of the type syntax element satisfies the preset condition, it indicates that the target slice and the next slice do not belong to the same frame; and the next slice is a slice in the network abstraction layer unit corresponding to the start code.

Optionally, the detecting module is further specifically configured to, if the numerical value of the type syntax element does not satisfy the preset condition, parse a Slice header of the next slice, and based on a parsing result of the Slice header of the next slice, determine coding blocks that need to be restored in the frame where the target slice is located, wherein when the parsing result indicates that the target slice and the next slice do not belong to the same frame, the coding blocks that need to be restored are equal to total coding blocks in the frame where the target slice is located minus coding blocks that have been decoded currently; and when the parsing result indicates that the target slice and the next slice belong to the same frame, the coding blocks that need to be restored are equal to total coding blocks in the frame where the target slice is located before the next slice minus the coding blocks that have been decoded currently.

Based on the same inventive concept, an embodiment of the present disclosure further provides a hardware decoder. It is configured to execute the video decoding method provided in the above embodiments.

The hardware decoder is a hardware device for decoding and restoring digital audio and video to analog audio and video signals. It may be composed by an application-specific integrated circuit, which is not limited in the present disclosure.

An embodiment of the present disclosure further provides a computer-readable storage medium, wherein the computer-readable storage medium stores a computer program thereon, and when executed by a computer, the computer program executes the steps contained in the above video decoding method.

It should be noted that various embodiments in the present description are described in a progressive manner, each embodiment focuses on differences from other embodiments, and the same or similar parts between various embodiments may be referred to each other.

In the several embodiments provided in the present disclosure, it should be understood that the device and the method disclosed also may be implemented in other manners. The device embodiments described above are merely exemplary, for example, the flowcharts and the block diagrams in the drawings illustrate possible system architectures, functions, and operations of the device, method, and computer program products according to multiple embodiments of the present disclosure. In this regard, each block in the flowcharts or block diagrams may represent a module, a part of program segment or code, the module, a part of the program segment or code includes one or more executable instructions for implementing specified logical functions. It should also be noted that, in some alternative embodiments, the functions noted in the blocks may also occur out of the order noted in the drawings. For example, two continuous blocks practically can be executed substantially in parallel, and they sometimes also may be executed in a reverse order, which depends upon the functions involved. It also should be noted that each block in the block diagrams and/or the flowcharts, and combinations of the blocks in the block diagrams and/or the flowcharts can be realized by a dedicated hardware-based system configured to execute a specified function or action, or can be realized by a combination of dedicated hardware and computer instructions.

Besides, various functional modules in various embodiments of the present disclosure can be integrated together to form one independent portion, and it is also feasible that various modules exist independently, or that two or more modules are integrated to form one independent portion.

If the function is realized in a form of software functional module and is sold or used as an individual product, it may be stored in one computer readable storage medium. Based on such understanding, the technical solutions in essence or parts making contribution to the prior art or parts of the technical solutions of the present disclosure can be embodied in form of a software product, and this computer software product is stored in a storage medium, including several instructions for making one computer device (which can be a personal computer, a notebook computer, a server or a network device, etc.) execute all or some of the steps of the methods of various embodiments of the present disclosure. The aforementioned storage medium includes various media in which program codes can be stored, such as U disk, mobile hard disk, read-only memory (ROM), random access memory (RAM), magnetic disk or optical disk.

In the text, relational terms, such as first and second, are only used to distinguish one entity or operation from another entity or operation, rather than necessarily requiring or implying any such actual relationship or sequence between these entities or operations.

The above-mentioned are merely embodiments of the present disclosure and not intended to limit the scope of protection of the present disclosure. For those skilled in the art, various modifications and variations could be made to the present disclosure. Any modifications, equivalent substitutions, improvements and so on, within the spirit and principle of the present disclosure, should be covered within the scope of protection of the present disclosure.

What is claimed is:

1. A video decoding method, wherein the method comprises:
   decoding a target slice of a to-be-decoded video;
   determining coding blocks that need to be restored in a frame where the target slice is located, when detecting occurrence of an error to a syntax element of the target slice; and
   restoring the coding blocks that need to be restored based on a global preset syntax element template, so as to perform forced decoding of the target slice;
   wherein the global preset syntax element template is constructed through following steps comprising,
   determining a preset value according to a meaning indicated by a key syntax element wherein the key syntax element is configured to determine a fixed decoding branch, and
   assigning a value to the key syntax element according to the determined preset value, to obtain the global preset syntax element template.

2. The method according to claim 1, wherein the key syntax element comprises syntax elements of a Slice header and syntax elements of a coding block.

3. The method according to claim 2, wherein the step of restoring the coding blocks that need to be restored based on a global preset syntax element template comprises:
   combining the coding blocks that need to be restored into a new slice; and
   restoring the new slice based on the global preset syntax element template, wherein
   in a restoring process, a slice type of the new slice is determined by whether the frame where the target slice is located contains a reference frame.

4. The method according to claim 1, wherein the step of restoring the coding blocks that need to be restored based on a global preset syntax element template comprises:
   combining the coding blocks that need to be restored into a new slice; and
   restoring the new slice based on the global preset syntax element template, wherein in a restoring process, a slice type of the new slice is determined by whether the frame where the target slice is located contains a reference frame.

5. The method according to claim 1, wherein the occurrence of an error to a syntax element of the target slice comprises occurrence of an error to a syntax element of a Slice header in the target slice.

6. The method according to claim 5, wherein the syntax element of the Slice header in the target slice is detected through following steps, comprising:
when detecting that a syntax element with the number of prefixes 0 greater than a preset threshold corresponding to a first syntax element exists in the first syntax element, determining that an error occurs to this syntax element, wherein the first syntax element is a syntax element based on Exponential-Golomb coding in the Slice header in the target slice.

7. The method according to claim 6, wherein the preset threshold is determined by a coding standard corresponding to each syntax element.

8. The method according to claim 1, wherein the step of determining coding blocks that need to be restored in a frame where the target slice is located, when detecting occurrence of an error to a syntax element of the target slice, comprises:
when detecting that an error occurs to a syntax element of a coding block in the target slice, reading a local preset syntax element template to correct this syntax element, and meanwhile reading a preset code stream template, so as to perform forced decoding of this coding block; and determining the coding blocks that need to be restored in the frame where the target slice is located.

9. The method according to claim 8, wherein after reading the preset code stream template, the method further comprises:
in response to a syntax element where an error occurs further existing in a to-be-decoded coding block, reading a preset value of a syntax element corresponding to the syntax element where the error occurs in the local preset syntax element template.

10. The method according to claim 8, wherein the syntax element of the coding block in the target slice is detected through following steps, comprising:
when detecting that a syntax element with the number of prefixes 1 greater than a preset threshold corresponding to a second syntax element exists in the second syntax element, determining that an error occurs to this syntax element, wherein the second syntax element is a syntax element based on CABAC coding in the coding block in the target slice.

11. The method according to claim 10, wherein the preset threshold is determined by a coding standard corresponding to each syntax element.

12. The method according to claim 1, wherein the step of determining coding blocks that need to be restored in a frame where the target slice is located comprises:
when detecting that no start code exists in a code stream behind the target slice, determining the coding blocks that need to be restored in the frame where the target slice is located, wherein the coding blocks that need to be restored are equal to total coding blocks in the frame where the target slice is located minus coding blocks that have been decoded currently.

13. The method according to claim 1, wherein the step of determining coding blocks that need to be restored in a frame where the target slice is located comprises:

when detecting that a start code exists in a code stream behind the target slice, decoding a network abstraction layer unit header corresponding to the start code, to obtain a type syntax element in the network abstraction layer unit header; and
determining the coding blocks that need to be restored in the frame where the target slice is located based on the type syntax element.

14. The method according to claim 13, wherein the step of determining the coding blocks that need to be restored in the frame where the target slice is located based on the type syntax element comprises:
determining, when a numerical value of the type syntax element satisfies a preset condition, the coding blocks that need to be restored in the frame where the target slice is located, wherein the coding blocks that need to be restored are equal to total coding blocks in the frame where the target slice is located minus coding blocks that have been decoded currently; and when the numerical value of the type syntax element satisfies the preset condition, indicating that the target slice and a next slice do not belong to the same frame; and the next slice is a slice in a network abstraction layer unit corresponding to the start code.

15. The method according to claim 13, wherein the step of determining the coding blocks that need to be restored in the frame where the target slice is located based on the type syntax element comprises:
when a numerical value of the type syntax element does not satisfy a preset condition, parsing a Slice header of a next slice, and determining the coding blocks that need to be restored in the frame where the target slice is located based on a parsing result of the Slice header of the next slice, wherein when the parsing result indicates that the target slice and the next slice do not belong to the same frame, the coding blocks that need to be restored are equal to total coding blocks in the frame where the target slice is located minus coding blocks that have been decoded currently; and when the parsing result indicates that the target slice and the next slice belong to the same frame, the coding blocks that need to be restored are equal to total coding blocks in the frame where the target slice is located before the next slice minus coding blocks that have been decoded currently.

16. A non-transitory computer-readable storage medium, on which a computer program is stored, wherein the computer program, when being run by a computer, executes the method according to claim 1.

17. A video decoding device, wherein the device comprises:
a decoding module, configured to decode a target slice of a to-be-decoded video;
a detecting module, configured to determine coding blocks that need to be restored in a frame where the target slice is located, when detecting occurrence of an error to a syntax element of the target slice; and
a restoring module, configured to restore the coding blocks that need to be restored based on a global preset syntax element template, so as to perform forced decoding of the target slice;
wherein the global preset syntax element template is obtained by determining a preset value according to a meaning indicated by a key syntax element, and assigning a value to the key syntax element according to the determined preset value, wherein the key syntax element is configured to determine a fixed decoding branch.

* * * * *